US012775798B2

(12) United States Patent
Darivemula et al.

(10) Patent No.: US 12,775,798 B2
(45) Date of Patent: Oct. 27, 2026

(54) SYSTEMS AND METHODS FOR PROVIDING RESPONSES TO USER QUERIES BASED ON ADJACENT KEYWORDS

(71) Applicant: Capital One Services, LLC, McLean, VA (US)

(72) Inventors: Savio Joseph Darivemula, Mckinney, TX (US); Justin Dupre, McLean, VA (US); Kevin Gaynor, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 189 days.

(21) Appl. No.: 18/605,648

(22) Filed: Mar. 14, 2024

(65) Prior Publication Data

US 2025/0292020 A1 Sep. 18, 2025

(51) Int. Cl.
*G06F 40/284* (2020.01)
*G06F 16/9535* (2019.01)
*G06F 16/9537* (2019.01)

(52) U.S. Cl.
CPC ........ *G06F 40/284* (2020.01); *G06F 16/9535* (2019.01); *G06F 16/9537* (2019.01)

(58) Field of Classification Search
CPC . G06F 40/284; G06F 16/9535; G06F 16/9537
See application file for complete search history.

(56) References Cited

U.S. PATENT DOCUMENTS 11,321,329 B1 * 5/2022 Shih ........................ G06N 20/20
2010/0169356 A1 * 7/2010 Malden .................. G06Q 30/02 707/767
2020/0401629 A1 * 12/2020 Lin ..................... G06F 16/2428
2022/0222260 A1 * 7/2022 Lin ........................ G06N 20/00
2024/0289861 A1 * 8/2024 Wang ................. G06Q 30/0631
2025/0005086 A1 * 1/2025 Bhargava .............. G06F 16/954
2025/0245249 A1 * 7/2025 Thunuguntla ......... G06F 40/284

* cited by examiner

*Primary Examiner* — Richemond Dorvil
*Assistant Examiner* — Adam Michael Weaver
(74) *Attorney, Agent, or Firm* — Foley & Lardner LLP

(57) ABSTRACT

Systems and methods for augmenting search query responses with adjacent keyword-based filters. In some aspects, the system receives a search query of text tokens. Using a first machine learning model, the system generates a set of adjacent keywords associated with similarity metrics. Based on a keyword database, the system generates popularity metrics for each adjacent keyword. For each adjacent keyword, the system uses its popularity metric and similarity metric to generate a filter. Based on the set of filters and a geographical location associated with the search query, the system produces a set of responses to the search query.

20 Claims, 4 Drawing Sheets

400

SYSTEMS AND METHODS FOR PROVIDING RESPONSES TO USER QUERIES BASED ON ADJACENT KEYWORDS

SUMMARY

Methods and systems are described herein for novel uses and/or improvements to artificial intelligence applications. As one example, methods and systems are described herein for a conversational program that provides information or suggested tools and items for a user's consideration in response to a plain-text search query. The system generates a set of adjacent keywords based on the search query, ranks the adjacent keywords based on a weighted combination of popularity and similarity metrics to the text of the search query, and then generates a set of filters corresponding to the adjacent keywords. The search filters may be used to derive search results from a search engine program or a machine learning model and find the intended information or suggestions corresponding to the search query.

Conventional systems are poorly adapted to assist a user with complex queries due to the system's narrow focus. Conventional systems lack the functionality to generate search filters based on a user query to a conversational language model in order to supplement the model to generate a comprehensive and relevant set of results for the user query. In particular, conventional systems do not generate and leverage adjacent keywords based on a user query as described herein because of challenges in accurately capturing the desired scope of the search query and in adapting the range of adjacent keywords to the user's preferences.

By contrast, systems and methods described herein use a balance of popularity and similarity metrics to accurately assess the intended scope of the search query, generate high-quality adjacent keywords, and tailor search filters to creatively assist the user in finding their desired search result while maintaining a high relevance for all suggestions offered to the user.

In some aspects, methods and systems are described herein comprising receiving a search query, wherein the search query comprises a series of text tokens; using a first machine learning model, generating a set of adjacent keywords from the series of text tokens, wherein each adjacent keyword in the set of adjacent keywords is associated with a similarity metric, wherein the similarity metric signifies a degree of relatedness from the adjacent keyword to a text token in the series of text tokens; based on a keyword database, generating popularity metrics for each adjacent keyword in the set of adjacent tokens; generating a set of filters by, for each adjacent keyword in the set of adjacent keywords, using a popularity metric associated with the adjacent keyword and a similarity metric associated with the adjacent keyword to generate a filter, wherein the set of filters is a collection of real values for input to a language processing model; and based on the set of filters and a geographical location associated with the search query, using a second machine learning model to produce a set of responses to the search query, wherein the second machine learning model is a language processing model trained to produce text responses based on input filters.

Various other aspects, features, and advantages of the systems and methods described herein will be apparent through the detailed description and the drawings attached hereto. It is also to be understood that both the foregoing general description and the following detailed description are examples and are not restrictive of the scope of the systems and methods described herein. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments described herein. It will be appreciated, however, by those having skill in the art that the embodiments may be practiced without these specific details or with an equivalent arrangement. In other cases, well-known structures and devices are shown in block diagram form in order to avoid unnecessarily obscuring the embodiments.

Figure 1:
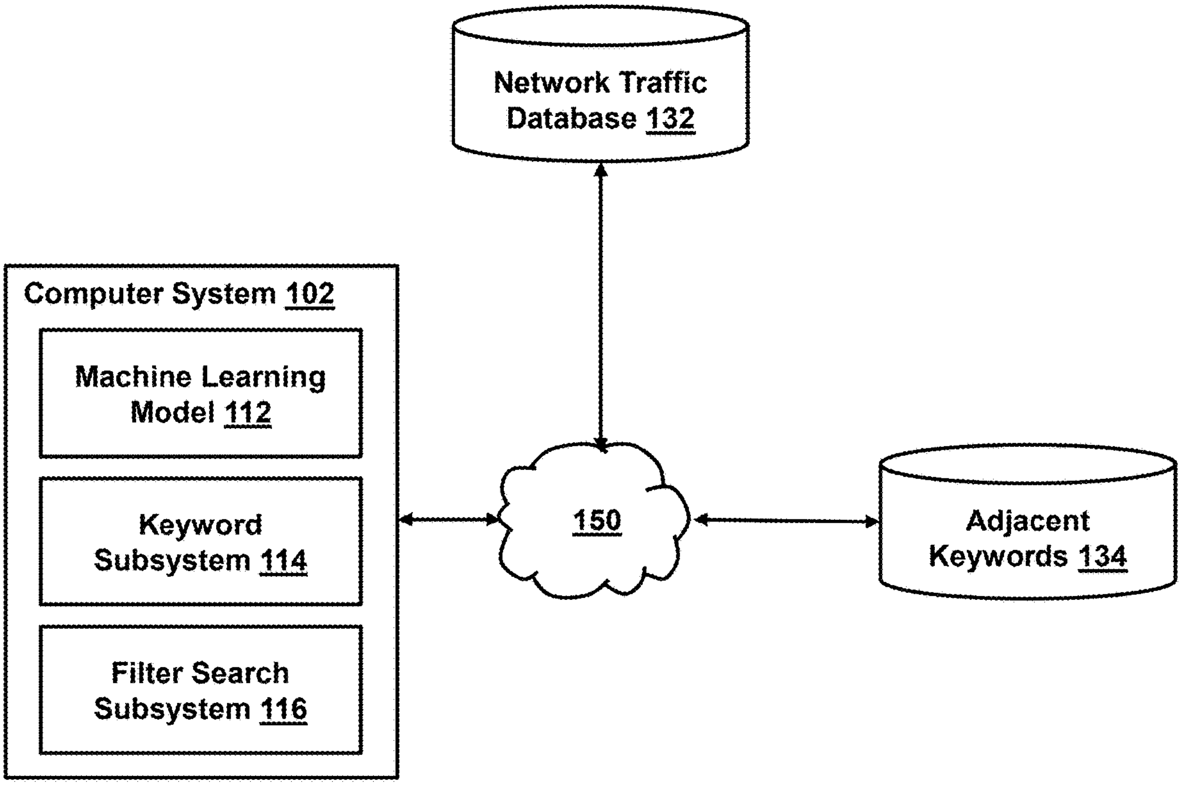
FIG. 1 shows an illustrative diagram for a system for providing responses to search queries by generating adjacent keywords and search filters, in accordance with one or more embodiments.

FIG. 1 shows an illustrative diagram for system 150, which contains hardware and software components used to provide responses to search queries based on adjacent keywords and filters generated using a machine learning model, in accordance with one or more embodiments. For example, Computer System 102, a part of system 150, may include Machine Learning Model 112, Keyword Subsystem 114, and Filter Search Subsystem 116. System 150 may create, store, or otherwise interact with Network Traffic Database 132 and Adjacent Keywords 134.

The system may be deployed to a conversational program for generating responses to search queries. Search queries may include a series of plain text tokens (e.g., words, sentences, and paragraphs) and may be directed at causing the system to generate suggestions in answer to a question posed in the search query. For example, a search query may require assistance in selecting a model of a car. The search query may specify "luxurious fun car" and be directed at causing the system to provide example car models fitting the description. The search query may be intended to elicit search results matching the description. For example, the user may expect to see makes and models of cars that fit the description of luxurious fun car or similar concepts, such as a selection of high-end sports cars. The system may present search results responsive to the search query in a user interface, for example, indicating a search bar where users may submit search queries, a filter selection panel, and a search result display.

System 150 may receive training data containing a first set of features, which may be used as input by a machine learning model (e.g., Machine Learning Model 112). The training data may be text sequences used to train a language processing model to determine similarities to other text sequences and tokens and to generate adjacent text tokens to an input text sequence. For example, Machine Learning Model 112 may be trained to embed text token sequences to real-valued embeddings, which are vectors uniquely corresponding to each text token. Using the embeddings, Machine Learning Model 112 is able to generate graphs and other relational data structures to store embeddings of one or more text tokens in a multi-dimensional embedding space. Using the embedding of a text token sequence and the relational data structure of embeddings for other text tokens, Machine Learning Model 112 can find similar words and phrases to an input word or phrase. In addition, Machine Learning Model 112 can produce an estimate between the similarity between an input text token and an output text token using the distance in the embedding space between the input token and the output token. Machine Learning Model 112 may be trained on datasets including data such as, for example, documents where co-occurrence frequencies of words are recorded or language inference maps concerning the relations between words. Machine Learning Model 112 can be trained using techniques like TF-IDF to estimate word frequency and may be trained to use algorithms like deep neural networks or Bidirectional Encoder Representations from Transformers algorithms. Machine Learning Model 112 may be trained using the gradient descent or backpropagation parameter tuning method and may be evaluated on a loss function assessing adherence to the training dataset. In some embodiments, Machine Learning Model 112 may be trained in an unsupervised or semi-supervised learning scheme to form associations between words and their embeddings in a relational data structure.

Machine Learning Model 112 processes the series of text tokens in the search query to generate a set of adjacent keywords (e.g., Adjacent Keywords 134). For example, each keyword in Adjacent Keywords 134 may contain a related concept to one or more aspects of the search query. An adjacent keyword may be a combination of words and phrases that represent a concept close to the search query. For example, an adjacent keyword to the search query "fun red car" may be "hip red car" or "trendy red sedan." Machine Learning Model 112 may identify Adjacent Keywords 134 by selecting embeddings with the least distance in the embedding space to the representation of the search query as a real-valued embedding. In some embodiments, Machine Learning Model 112 may select a set number of embeddings for Adjacent Keywords 134 and therefore may select the number of closest embeddings in the embedding space. For example, Keyword Subsystem 114 may generate a similarity metric corresponding to each adjacent keyword in Adjacent Keywords 134, the similarity metric being inversely proportional to the distance between the embedding of the adjacent keyword and the embedding of the search query.

The system (e.g., Keyword Subsystem 114) may determine a popularity metric for each adjacent keyword in Adjacent Keywords 134. The popularity metric can be generated based on a network traffic database to indicate the level of interest the user likely has regarding each keyword in Adjacent Keywords 134. In some embodiments, Keyword Subsystem 114 may retrieve time-series datasets from the network traffic database comprising traffic data, which is indicative of search volumes or other internet traffic volumes related to keywords in Adjacent Keywords 134. For example, Keyword Subsystem 114 may retrieve search queries and click-throughs on a search engine website. Each keyword in Adjacent Keywords 134 is associated with a popularity metric, which may be computed from the network traffic database by, for example, generating a moving average of daily click-throughs to search engine results for the past 30 days. Alternatively, or additionally, in some embodiments, Keyword Subsystem 114 may retrieve a user interest profile corresponding to the search query. The user interest profile may be generated using previous search queries from the same user or from search queries of users deemed similar to the user making the current search query. The user interest profile indicates the likelihood that a user is interested in a concept or product and may be a correspondence map from text token embeddings to real-valued weights proportional to expected probabilities of interest. In some embodiments, Keyword Subsystem 114 may weight the network traffic data by the user interest profile. For example, the system may multiply the network traffic data by a weight value in the user interest profile corresponding to the keyword in question.

For each keyword in Adjacent Keywords 134, Filter Search Subsystem 116 generates a filter based on its popularity metric and similarity metric. For example, Filter Search Subsystem 116 computes a relevance metric based on a mathematical combination of the popularity metric and the similarity metric. In some embodiments, the relevance metric may be the larger of the similarity metric and the popularity metric. In other embodiments, the relevance metric may be a weighted average of the two. Filter Search Subsystem 116 may generate filters for keywords in Adjacent Keywords 134 that have a relevance metric above a numeric threshold. In some embodiments, Filter Search Subsystem 116 may select the keywords in Adjacent Keywords 134 with the highest relevance metrics to generate a filter corresponding to each of the selected keywords. A filter is a plain-text sequence of words or phrases that can be used to express a concept or direct a search at a search engine program. In some embodiments, a filter may simply be the plain text of its adjacent keyword. In some other embodiments, a filter for an adjacent keyword may be generated using the embedding values of one or more adjacent keywords. For example, a filter can be generated using multiple keywords by taking a distance-weighted average of their embeddings. The filter can then be translated from a real-valued embedding to a plain-text search term using an embedding map, which is a data structure relating embeddings to plain-text words. The embedding map may, for example, be a data structure resulting from the training of Machine Learning Model 112, an extension of Machine Learning Model 112, or a specifically trained model. In some embodiments, a filter may include a numerical value, such as the embedding for its corresponding keyword, or an average embedding of a set of keywords.

Using the set of filters, Filter Search Subsystem 116 produces a set of responses to the search query. The set of responses may be search results for a product the search query was seeking or textual responses providing information for the search query. Filter Search Subsystem 116 may use a filter in its plain-text or real-valued form to generate search engine results. For example, Filter Search Subsystem 116 may input one or more filters to a search engine program, where the search engine program provides sample products and/or information when prompted with a filter. For example, the search engine program provides items retrieved from a database. The search engine program may use an algorithm to search the database using one or more input filters and generate search results matching the input filters. For example, Filter Search Subsystem 116 may cause the search engine program to generate suggested items corresponding to the filters "fun red car" and "under 50,000 dollars," and the search engine may return makes and models of products. Alternatively, in some embodiments, the set of responses may be generated using, for example, a second machine learning model. The second machine learning model may be distinct from Machine Learning Model 112 in that the second model is trained to generate informational or product-based responses to text input by interacting with a search engine program. For example, the second machine learning model may be configured to aggregate search results using multiple filters from a search engine, for example, by ranking the results based on the user interest profile.

Figure 2:
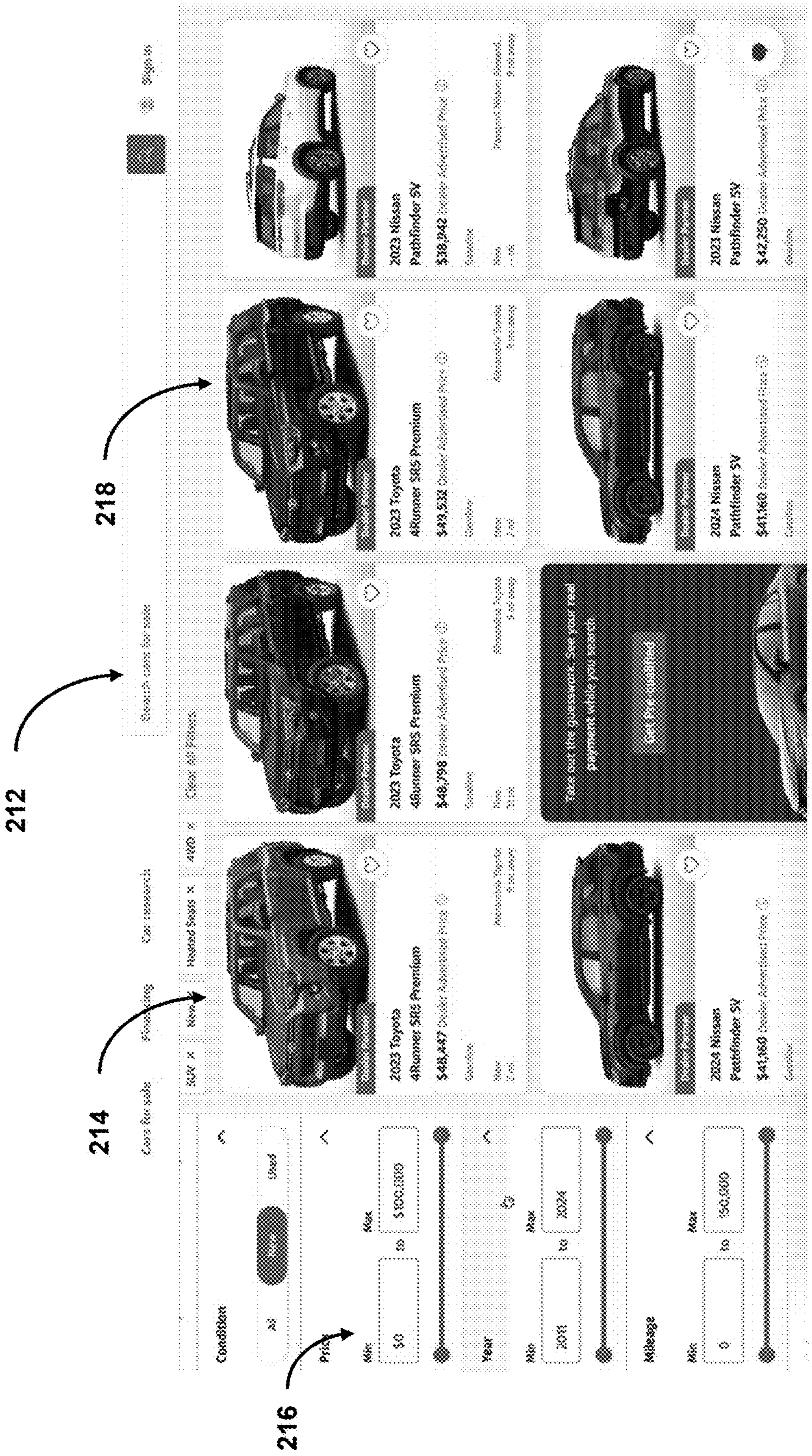
FIG. 2 shows an interface displaying results presented to a user for a search query, in accordance with one or more embodiments.

FIG. 2 shows an interface where a user may see results displayed, the results being generated using a search engine from filters and keywords based on a search query the user submitted.

On the user interface is a search bar (e.g., Search Bar 212) where the user may submit plain-text search queries. In this example program, the search queries may often be related to searching for cars for sale. The user may input a description of a desired car, such as "red Honda Civic," or an intended impression upon which the system may generate suggestions to help the user ideate, such as "luxurious fun coupe." In this example conversational program, the system may be tasked with providing example makes and models meeting the descriptions input in Search Bar 212. The system may additionally provide metadata, such as prices of particular cars, mileage, pre-ownership, and dealerships where such a car might be available. In order to present search results most likely to satisfy the user's search query, the system may generate a set of filters (e.g., Suggested Filters 214).

To generate Suggested Filters 214, the system may generate adjacent keywords based on the user's search query. An adjacent keyword may capture a concept close to the search query or may expand on the search query to explore related products. For example, an adjacent keyword to the search query "fun red car" may be "hip red car" or "trendy red sedan." The system may generate the adjacent keywords by selecting embeddings with the least distance in an embedding space to the representation of the search query as a real-valued embedding. The system may generate a similarity metric corresponding to each adjacent keyword, the similarity metric being inversely proportional to the distance between the embedding of the adjacent keyword and the embedding of the search query.

The system may determine a popularity metric for each adjacent keyword based on a network traffic database to indicate the level of interest the user likely has regarding each keyword. In some embodiments, the system may weight the network traffic data by the user interest profile. For each adjacent keyword, the system generates a filter based on its popularity metric and similarity metric. For example, the system computes a relevance metric based on a mathematical combination of the popularity metric and the similarity metric. For adjacent keywords with relevance metrics above a threshold, the system may select the adjacent keyword for use as a keyword in aiding the search query, for example, by using it as a filter in the set of filters (e.g., Suggested Filters 214). Suggested Filters 214 may be a set of text tags that the user may adopt in using the search engine or machine learning model to provide example products. Each filter may correspond to an aspect of the search query.

In addition to Suggested Filters 214, the system may display manual filters on the user interface (e.g., Manual Filters 216). Manual Filters 216 may be additional constraints that the user may specify that cause the system to further limit the search results displayed. Manual Filters 216 allow the user to further define their desired search results beyond the textual description in Search Bar 212, such as providing price ranges, production year ranges, and mileage ranges. The user may interact with Manual Filters 216 to provide additional information, and Manual Filters 216 will be combined with Suggested Filters 214 to generate a set of new search results. For example, the system may send an application programming interface (API) request to the search engine program and request search results matching all filters in Suggested Filters 214 and Manual Filters 216 in order to provide the user with the most satisfactory products.

With all the correct filters in place, the system displays search results (e.g., Search Results 218) for the user. The system may generate Search Results 218 by sending a request such as an API pull request to a search engine program or a machine learning model set up for the purpose of providing example products in response to an input set of filters. For example, the set of filters may include "0 to $50,000," "SUV," "new," and "4WD." With the set of filters, the search engine program or the machine learning model will provide a set of cars that satisfy all the conditions set forth by the filters, and the system may present the set of cars as search results the user may browse.

Figure 3:
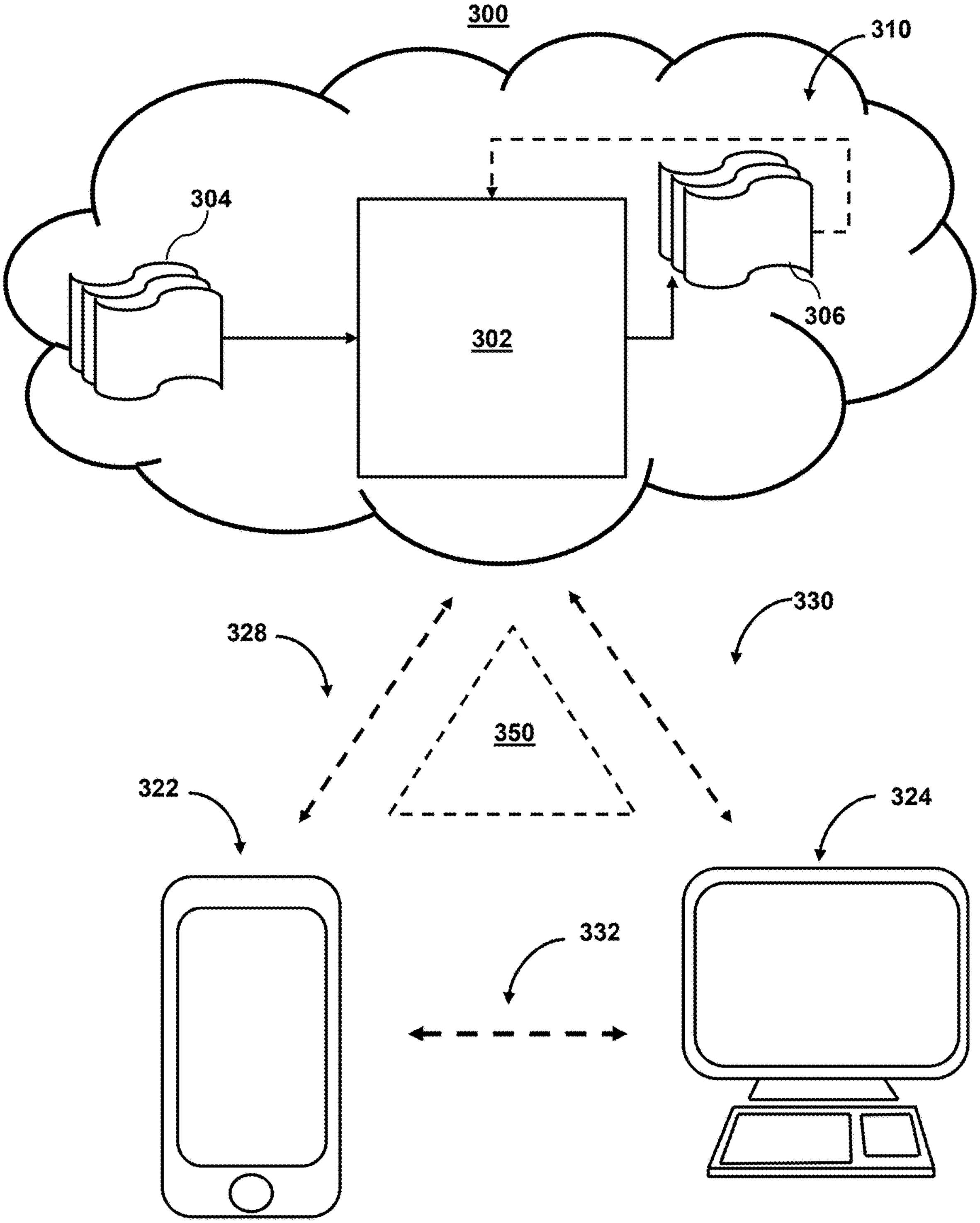
FIG. 3 shows illustrative components for a system for providing responses to search queries by generating adjacent keywords and search filters, in accordance with one or more embodiments.

FIG. 3 shows illustrative components for a system used to communicate between the system and user devices and collect data, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that, in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., classifying a product into one or more filters to match the set of filters for presentation to the user).

In some embodiments, the model (e.g., model 302) may automatically perform actions based on outputs 306. In some embodiments, the model (e.g., model 302) may not perform any actions.

System 300 also includes API layer 350. API layer 350 may allow the system to generate summaries across different devices. In some embodiments, API layer 350 may be implemented on mobile device 322 or user terminal 324. Alternatively, or additionally, API layer 350 may reside on one or more of cloud components 310. API layer 350 (which may be a REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services as well as for exchanging information with partners in B2B transactions.

API layer 350 may use various architectural arrangements. For example, system 300 may be partially based on API layer 350 such that there is strong adoption of SOAP and RESTful web services, using resources like Service Repository and Developer Portal, but with low governance, standardization, and separation of concerns. Alternatively, system 300 may be fully based on API layer 350 such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of API layer 350 may provide integration between front-end and back-end. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API platforms and their modules. API layer 350 may use a developer portal. API layer 350 may use strong security constraints applying WAF and DDoS protection, and API layer 350 may use RESTful APIs as standard for external integration.

Figure 4:
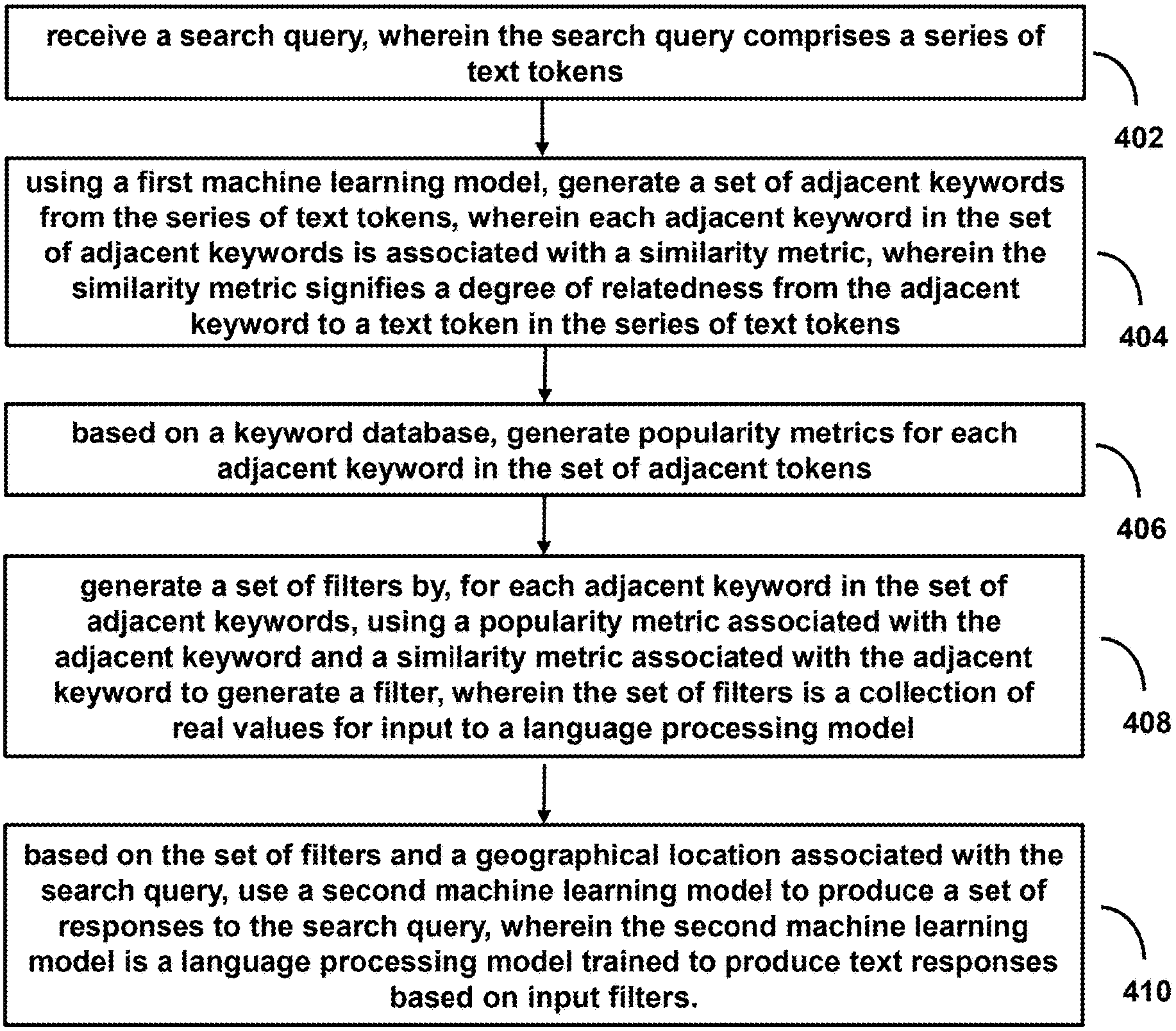
FIG. 4 shows a flowchart of the steps involved in providing responses to search queries by generating adjacent keywords and search filters, in accordance with one or more embodiments.

FIG. 4 shows a flowchart of the steps involved in providing search query responses using adjacent keywords and search filters, in accordance with one or more embodiments. For example, the system may use process 400 (e.g., as implemented on one or more system components described above) in order to generate adjacent keywords based on embeddings of search queries, compute similarity and popularity metrics for each adjacent keyword, generate filters based on adjacent keywords, and use filters to provide responses to search queries.

At step 402, process 400 (e.g., using one or more components described above) receives a search query comprising a series of text tokens. The system may be deployed to a conversational program for generating responses to search queries. Search queries may include a series of plain text tokens (e.g., words, sentences, and paragraphs) and may be directed at causing the system to generate suggestions in answer to a question posed in the search query. For example, a search query may require assistance in selecting a model of a car. The search query may specify "luxurious fun car" and be directed at causing the system to provide example car models fitting the description. The search query may be intended to elicit search results matching the description. For example, the user may expect to see makes and models of cars that fit the description of luxurious fun car or similar concepts, such as a selection of high-end sports cars. The system may present search results responsive to the search query in a user interface, for example, indicating a search bar where users may submit search queries, a filter selection panel, and a search result display.

At step 404, process 400 (e.g., using one or more components described above) uses a first machine learning model to generate a set of adjacent keywords from the series of text tokens. System 150 may receive training data containing a first set of features, which may be used as input by a machine learning model (e.g., Machine Learning Model 112). The training data may be text sequences used to train a language processing model to determine similarities to other text sequences and tokens and to generate adjacent text tokens to an input text sequence. For example, Machine Learning Model 112 may be trained to embed text token sequences to real-valued embeddings, which are vectors uniquely corresponding to each text token. Using the embeddings, Machine Learning Model 112 is able to generate graphs and other relational data structures to store embeddings of one or more text tokens in a multi-dimensional embedding space. Using the embedding of a text token sequence and the relational data structure of embeddings for other text tokens, Machine Learning Model 112 can find similar words and phrases to an input word or phrase. In addition, Machine Learning Model 112 can produce an estimate between the similarity between an input text token and an output text token using the distance in the embedding space between the input token and the output token. Machine Learning Model 112 may be trained on datasets including data such as, for example, documents where co-occurrence frequencies of words are recorded or language inference maps concerning the relations between words. Machine Learning Model 112 can be trained using techniques like TF-IDF to estimate word frequency and may be trained to use algorithms like deep neural networks or Bidirectional Encoder Representations from Transformers algorithms. Machine Learning Model 112 may be trained using the gradient descent or backpropagation parameter tuning method and may be evaluated on a loss function assessing adherence to the training dataset. In some embodiments, Machine Learning Model 112 may be trained in an unsupervised or semi-supervised learning scheme to form associations between words and their embeddings in a relational data structure.

Machine Learning Model 112 processes the series of text tokens in the search query to generate a set of adjacent keywords (e.g., Adjacent Keywords 134). For example, each keyword in Adjacent Keywords 134 may contain a related concept to one or more aspects of the search query. An adjacent keyword may be a combination of words and phrases that represent a concept close to the search query. For example, an adjacent keyword to the search query "fun red car" may be "hip red car" or "trendy red sedan." Machine Learning Model 112 may identify Adjacent Keywords 134 by selecting embeddings with the least distance in the embedding space to the representation of the search query as a real-valued embedding. In some embodiments, Machine Learning Model 112 may select a set number of embeddings for Adjacent Keywords 134 and therefore may select the number of closest embeddings in the embedding space. For example, Keyword Subsystem 114 may generate a similarity metric corresponding to each adjacent keyword in Adjacent Keywords 134, the similarity metric being inversely proportional to the distance between the embedding of the adjacent keyword and the embedding of the search query.

At step 406, process 400 (e.g., using one or more components described above) generates popularity metrics for each adjacent keyword in the set of adjacent tokens based on a keyword database. The system (e.g., Keyword Subsystem 114) may determine a popularity metric for each adjacent keyword in Adjacent Keywords 134. The popularity metric can be generated based on a network traffic database to indicate the level of interest the user likely has regarding each keyword in Adjacent Keywords 134. In some embodiments, Keyword Subsystem 114 may retrieve time-series datasets from the network traffic database comprising traffic data, which is indicative of search volumes or other internet traffic volumes related to keywords in Adjacent Keywords 134. For example, Keyword Subsystem 114 may retrieve search queries and click-throughs on a search engine website. Each keyword in Adjacent Keywords 134 is associated with a popularity metric, which may be computed from the network traffic database by, for example, generating a moving average of daily click-throughs to search engine results for the past 30 days. Alternatively, or additionally, in some embodiments, Keyword Subsystem 114 may retrieve a user interest profile corresponding to the search query. The user interest profile may be generated using previous search queries from the same user or from search queries of users deemed similar to the user making the current search query. The user interest profile indicates the likelihood that a user is interested in a concept or product and may be a correspondence map from text token embeddings to real-valued weights proportional to expected probabilities of interest. In some embodiments, Keyword Subsystem 114 may weight the network traffic data by the user interest profile. For example, the system may multiply the network traffic data by a weight value in the user interest profile corresponding to the keyword in question.

At step 408, process 400 (e.g., using one or more components described above) generates a set of filters by, for each adjacent keyword in the set of adjacent keywords, using a popularity metric associated with the adjacent keyword and a similarity metric associated with the adjacent keyword to generate a filter. For each keyword in Adjacent Keywords 134, Filter Search Subsystem 116 generates a filter based on its popularity metric and similarity metric. For example, Filter Search Subsystem 116 computes a relevance metric based on a mathematical combination of the popularity metric and the similarity metric. In some embodiments, the relevance metric may be the larger of the similarity metric and the popularity metric. In other embodiments, the relevance metric may be a weighted average of the two. Filter Search Subsystem 116 may generate filters for keywords in Adjacent Keywords 134 that have a relevance metric above a numeric threshold. In some embodiments, Filter Search Subsystem 116 may select the keywords in Adjacent Keywords 134 with the highest relevance metrics to generate a filter corresponding to each of the selected keywords. A filter is a plain-text sequence of words or phrases that can be used to express a concept or direct a search at a search engine program. In some embodiments, a filter may simply be the plain text of its adjacent keyword. In some other embodiments, a filter for an adjacent keyword may be generated using the embedding values of one or more adjacent keywords. For example, a filter can be generated using multiple keywords by taking a distance-weighted average of their embeddings. The filter can then be translated from a real-valued embedding to a plain-text search term using an embedding map, which is a data structure relating embeddings to plain-text words. The embedding map may, for example, be a data structure resulting from the training of Machine Learning Model 112, an extension of Machine Learning Model 112, or a specifically trained model. In some embodiments, a filter may include a numerical value, such as the embedding for its corresponding keyword or an average embedding of a set of keywords.

At step 410, process 400 (e.g., using one or more components described above) uses a second machine learning model to produce a set of responses to the search query based on the set of filters and a geographical location associated with the search query. Using the set of filters, Filter Search Subsystem 116 produces a set of responses to the search query. The set of responses may be search results for a product the search query was seeking or textual responses providing information for the search query. Filter Search Subsystem 116 may use a filter in its plain-text or real-valued form to generate search engine results. For example, Filter Search Subsystem 116 may input one or more filters to a search engine program, where the search engine program provides sample products and/or information when prompted with a filter. For example, the search engine program provides items retrieved from a database. The search engine program may use an algorithm to search the database using one or more input filters and generate search results matching the input filters. For example, Filter Search Subsystem 116 may cause the search engine program to generate suggested items corresponding to the filters "fun red car" and "under 50,000 dollars," and the search engine may return makes and models of products. Alternatively, in some embodiments, the set of responses may be generated using, for example, a second machine learning model. The second machine learning model may be distinct from Machine Learning Model 112 in that the second model is trained to generate informational or product-based responses to text input by interacting with a search engine program. For example, the second machine learning model may be configured to aggregate search results using multiple filters from a search engine, for example, by ranking the results based on the user interest profile.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating responses to a search query for a chatbot, comprising: receiving a search query for a conversational program, wherein the search query comprises a series of text tokens, and wherein the search query requires information in response; using a first machine learning model, generating a set of adjacent keywords from the series of text tokens, wherein each adjacent keyword in the set of adjacent keywords is associated with a similarity metric, wherein the similarity metric signifies a degree of relatedness from the adjacent keyword to a text token in the series of text tokens; based on a keyword database, generating popularity metrics for each adjacent keyword in the set of adjacent tokens; generating a set of filters by, for each adjacent keyword in the set of adjacent keywords, using a popularity metric associated with the adjacent keyword and a similarity metric associated with the adjacent keyword to generate a filter, wherein the set of filters is a collection of real values for input to a language processing model; and based on the set of filters and a user interest dataset, using a second machine learning model to produce a set of responses for the conversational program to provide in response to the search query, wherein the second machine learning model is a language processing model trained to produce text responses based on input filters, and wherein the user interest dataset indicates the interest for each filter in the set of filters from similar users as the originator of the search request.

2. A method for generating responses to a search query, the method comprising: receiving a search query, wherein the search query comprises a series of text tokens; using a first machine learning model, generating a set of adjacent keywords from the series of text tokens, wherein each adjacent keyword in the set of adjacent keywords is associated with a similarity metric, wherein the similarity metric signifies a degree of relatedness from the adjacent keyword to a text token in the series of text tokens; based on a keyword database, generating popularity metrics for each adjacent keyword in the set of adjacent tokens; generating a set of filters by, for each adjacent keyword in the set of adjacent keywords, using a popularity metric associated with the adjacent keyword and a similarity metric associated with the adjacent keyword to generate a filter, wherein the set of filters is a collection of real values for input to a language processing model; and based on the set of filters and a geographical location associated with the search query, using a second machine learning model to produce a set of responses to the search query, wherein the second machine learning model is a language processing model trained to produce text responses based on input filters.

3. A method comprising: receiving a search query, wherein the search query comprises a series of text tokens; using a first machine learning model, generating a set of adjacent keywords from the series of text tokens, wherein each adjacent keyword in the set of adjacent keywords is associated with a similarity metric, wherein the similarity metric signifies a degree of relatedness from the adjacent keyword to a text token in the series of text tokens; based on a keyword database, generating popularity metrics for each adjacent keyword in the set of adjacent tokens; generating a set of filters by, for each adjacent keyword in the set of adjacent keywords, using a popularity metric associated with the adjacent keyword and a similarity metric associated with the adjacent keyword to generate a filter, wherein the set of filters is a collection of real values for input to a language processing model; and based on the set of filters and a geographical location associated with the search query, using a second machine learning model to produce a set of responses to the search query, wherein the second machine learning model is a language processing model trained to produce text responses based on input filters.

4. The method of any one of the preceding embodiments, wherein the popularity metric for an adjacent keyword in the set of adjacent keywords is generated based on a network traffic database.

5. The method of any one of the preceding embodiments, wherein generating the popularity metric based on a network traffic database comprises: retrieving traffic data from the network traffic database, wherein the traffic data specifies viewership of search results related to the adjacent keyword, and wherein the traffic data is a time-series dataset; and generating the popularity metric to be a time-weighted average from the traffic data, wherein the time-weighted average is a real value giving more weight to more recent search results of the traffic data.

6. The method of any one of the preceding embodiments, wherein generating the popularity metric based on a network traffic database comprises: retrieving a user interest profile, wherein the user interest profile is a vector of weights for areas of interest corresponding to a user associated with the search query; retrieving traffic data from the network traffic database, wherein the traffic data specifies viewership of search results related to the adjacent keyword; and generating the popularity metric to be an average of the traffic data weighted by the user interest profile.

7. The method of any one of the preceding embodiments, wherein the embedding map is generated by a third machine learning model trained to correspond text tokens to real values.

8. The method of any one of the preceding embodiments, further comprising: based on the set of filters, using the second machine learning model to produce search terms corresponding to the set of filters, the search terms being plain-text descriptions corresponding to the set of filters; and generating first search engine results based on the search terms, wherein the first search engine results comprise data acquired by accessing a search engine for information relating to the search terms.

9. The method of any one of the preceding embodiments, wherein producing the set of responses to the search query comprises: generating a filter ranking by ranking the set of filters according to the popularity metric associated with the adjacent keyword of each filter; based on the filter ranking, generating a set of input filters, wherein the set of input filters is selected from the set of filters to exceed a percentile of the filter ranking; and using the set of input filters as input to the second machine learning model, generating the set of responses to the search query.

10. The method of any one of the preceding embodiments, wherein generating the set of adjacent keywords comprises: using the first machine learning model, processing the series of text tokens in conjunction with each potential keyword in a list of potential keywords; receiving, as output from the first machine learning model, a list of similarity metrics, the list of similarity metrics corresponding to the list of potential keywords; and selecting a predetermined number of potential keywords from the list of potential keywords based on the list of similarity metrics.

11. The method of any one of the preceding embodiments, further comprising: receiving user input in response to the set of responses to the search query, the user input indicating a degree of relatedness of the search query to the set of responses; and based on the user input, creating a user profile, wherein the user profile is used to generate popularity metrics when providing responses to search queries associated with the user profile.

12. The method of any one of the preceding embodiments, wherein the second machine learning model is a Bidirectional Encoder Representations from Transformers model trained on data comprising past responses to user queries.

13. The method of any one of the preceding embodiments, wherein generating a filter in the set of filters comprises: using a first mathematical transformation, generate a relevance metric based on a popularity metric and a similarity metric for an adjacent keyword; in response to the relevance metric exceeding a numeric threshold, determining to generate a filter corresponding to the adjacent keyword; and using an embedding map, generating the filter based on the adjacent keyword.

14. One or more non-transitory, computer-readable media storing instructions that, when executed by a data processing apparatus, cause the data processing apparatus to perform operations comprising those of any of embodiments 1-13.

15. A system comprising one or more processors; and memory storing instructions that, when executed by the processors, cause the processors to effectuate operations comprising those of any of embodiments 1-13.

16. A system comprising means for performing any of embodiments 1-13.

What is claimed is:

1. A system, the system comprising:

one or more processors; and one or more non-transitory, computer-readable media comprising instructions that, when executed by the one or more processors, cause operations comprising:

training a first machine learning model to generate a set of adjacent keywords from a series of text tokens;

receiving a search query for a conversational program, wherein the search query comprises the series of text tokens, and wherein the search query requires information in response;

using the first machine learning model, generating the set of adjacent keywords from the series of text tokens, wherein each adjacent keyword in the set of adjacent keywords is associated with a similarity metric that is inversely proportional to a distance between an embedding of the adjacent keyword and an embedding of the search query, wherein the similarity metric signifies a degree of relatedness from the adjacent keyword to a text token in the series of text tokens;

based on a keyword database, generating popularity metrics for each adjacent keyword in the set of adjacent tokens;

generating a set of filters by, for each adjacent keyword in the set of adjacent keywords, using a popularity metric associated with the adjacent keyword and a similarity metric associated with the adjacent keyword to generate a filter, wherein the set of filters is a collection of real values for input to a language processing model; and based on the set of filters and a user interest dataset, using a second machine learning model to produce a set of responses for the conversational program to provide in response to the search query, wherein the second machine learning model is a language processing model trained to produce text responses based on input filters, and wherein the user interest dataset indicates the interest for each filter in the set of filters from similar users as an originator of the search query.

2. A method for generating responses to a search query, the method comprising:

receiving a search query, wherein the search query comprises a series of text tokens;

using a first machine learning model, generating a set of adjacent keywords from the series of text tokens, wherein each adjacent keyword in the set of adjacent keywords is associated with a similarity metric that is inversely proportional to a distance between an embedding of the adjacent keyword and an embedding of the search query;

based on a keyword database, generating popularity metrics for each adjacent keyword in the set of adjacent tokens;

generating a set of filters by, for each adjacent keyword in the set of adjacent keywords, using a popularity metric associated with the adjacent keyword and a similarity metric associated with the adjacent keyword to generate a filter, wherein the set of filters is a collection of real values for input to a language processing model;

training a second machine learning model to produce text responses based on input filters; and based on the set of filters and a geographical location associated with the search query, using the second machine learning model to produce a set of responses to the search query.

3. The method of claim 2, wherein the popularity metric for an adjacent keyword in the set of adjacent keywords is generated based on a network traffic database.

4. The method of claim 3, wherein generating the popularity metric based on a network traffic database comprises:

retrieving traffic data from the network traffic database, wherein the traffic data specifies viewership of search results related to the adjacent keyword, and wherein the traffic data is a time-series dataset; and generating the popularity metric to be a time-weighted average from the traffic data, wherein the time-weighted average is a real value giving more weight to more recent search results of the traffic data.

5. The method of claim 3, wherein generating the popularity metric based on a network traffic database comprises:

retrieving a user interest profile, wherein the user interest profile is a vector of weights for areas of interest corresponding to a user associated with the search query;

retrieving traffic data from the network traffic database, wherein the traffic data specifies viewership of search results related to the adjacent keyword; and generating the popularity metric to be an average of the traffic data weighted by the user interest profile.

6. The method of claim 2, wherein generating a filter in the set of filters comprises:

using a first mathematical transformation, generating a relevance metric based on a popularity metric and a similarity metric for an adjacent keyword;

in response to the relevance metric exceeding a numeric threshold, determining to generate a filter corresponding to the adjacent keyword; and using an embedding map, generating the filter based on the adjacent keyword.

7. The method of claim 6, wherein the embedding map is generated by a third machine learning model trained to correspond text tokens to real values.

8. The method of claim 2, further comprising:

based on the set of filters, using the second machine learning model to produce search terms corresponding to the set of filters, the search terms being plain-text descriptions corresponding to the set of filters; and generating first search engine results based on the search terms, wherein the first search engine results comprise data acquired by accessing a search engine for information relating to the search terms.

9. The method of claim 2, wherein producing the set of responses to the search query comprises:

generating a filter ranking by ranking the set of filters according to the popularity metric associated with the adjacent keyword of each filter;

based on the filter ranking, generating a set of input filters, wherein the set of input filters is selected from the set of filters to exceed a percentile of the filter ranking; and using the set of input filters as input to the second machine learning model, generating the set of responses to the search query.

10. The method of claim 2, wherein generating the set of adjacent keywords comprises:

using the first machine learning model, processing the series of text tokens in conjunction with each potential keyword in a list of potential keywords;

receiving, as output from the first machine learning model, a list of similarity metrics, the list of similarity metrics corresponding to the list of potential keywords; and selecting a predetermined number of potential keywords from the list of potential keywords based on the list of similarity metrics.

11. The method of claim 2, further comprising:

receiving user input in response to the set of responses to the search query, the user input indicating a degree of relatedness of the search query to the set of responses; and based on the user input, creating a user profile, wherein the user profile is used to generate popularity metrics when providing responses to search queries associated with the user profile.

12. The method of claim 2, wherein the second machine learning model is a Bidirectional Encoder Representations from Transformers model trained on data comprising past responses to user queries.

13. One or more non-transitory, computer-readable media comprising instructions that, when executed by one or more processors, cause operations comprising:

training one or more of a first machine learning model or a second machine learning model for processing a search query;

receiving the search query, wherein the search query comprises a series of text tokens;

using the first machine learning model, generating a set of adjacent keywords from the series of text tokens, wherein each adjacent keyword in the set of adjacent keywords is associated with a similarity metric that is inversely proportional to a distance between an embedding of the adjacent keyword and an embedding of the search query;

based on a keyword database, generating popularity metrics for each adjacent keyword in the set of adjacent tokens;

generating a set of filters by, for each adjacent keyword in the set of adjacent keywords, using a popularity metric associated with the adjacent keyword and a similarity metric associated with the adjacent keyword to generate a filter, wherein the set of filters is a collection of real values for input to a language processing model; and based on the set of filters and a geographical location associated with the search query, using the second machine learning model to produce a set of responses to the search query, wherein the second machine learning model is a language processing model trained to produce text responses based on input filters.

14. The one or more non-transitory, computer-readable media of claim 13, wherein the popularity metric for an adjacent keyword in the set of adjacent keywords is generated based on a network traffic database.

15. The one or more non-transitory, computer-readable media of claim 14, wherein generating the popularity metric based on a network traffic database comprises:

retrieving a user interest profile, wherein the user interest profile is a vector of weights for areas of interest corresponding to a user associated with the search query;

retrieving traffic data from the network traffic database, wherein the traffic data specifies viewership of search results related to the adjacent keyword; and generating the popularity metric to be an average of the traffic data weighted by the user interest profile.

16. The one or more non-transitory, computer-readable media of claim 14, wherein generating the popularity metric based on a network traffic database comprises:

retrieving traffic data from the network traffic database, wherein the traffic data specifies viewership of search results related to the adjacent keyword, and wherein the traffic data is a time-series dataset; and generating the popularity metric to be a time-weighted average from the traffic data, wherein the time-weighted average is a real value giving more weight to more recent search results of the traffic data.

17. The one or more non-transitory, computer-readable media of claim 13, wherein generating a filter in the set of filters comprises:

using a first mathematical transformation, generating a relevance metric based on a popularity metric and a similarity metric for an adjacent keyword;

in response to the relevance metric exceeding a numeric threshold, determining to generate a filter corresponding to the adjacent keyword; and using an embedding map, generating the filter based on the adjacent keyword.

18. The one or more non-transitory, computer-readable media of claim 13, wherein the operations further comprise:

based on the set of filters, using the second machine learning model to produce search terms corresponding to the set of filters, the search terms being plain-text descriptions corresponding to the set of filters; and generating first search engine results based on the search terms, wherein the first search engine results comprise data acquired by accessing a search engine for information relating to the search terms.

19. The one or more non-transitory, computer-readable media of claim 13, wherein producing the set of responses to the search query comprises:

generating a filter ranking by ranking the set of filters according to the popularity metric associated with the adjacent keyword of each filter;

based on the filter ranking, generating a set of input filters, wherein the set of input filters is selected from the set of filters to exceed a percentile of the filter ranking; and using the set of input filters as input to the second machine learning model, generating the set of responses to the search query.

20. The one or more non-transitory, computer-readable media of claim 13, wherein generating the set of adjacent keywords comprises:

using the first machine learning model, processing the series of text tokens in conjunction with each potential keyword in a list of potential keywords;

receiving, as output from the first machine learning model, a list of similarity metrics, the list of similarity metrics corresponding to the list of potential keywords; and selecting a predetermined number of potential keywords from the list of potential keywords based on the list of similarity metrics.

* * * * *